United States Patent [19]

Bleeker

[11] Patent Number: 5,129,993
[45] Date of Patent: Jul. 14, 1992

[54] METHOD FOR TREATING MANURE

[75] Inventor: Erik D. J. Bleeker, Epe, Netherlands

[73] Assignee: MeMon B.V., Deventer, Netherlands

[21] Appl. No.: 511,463

[22] Filed: Apr. 20, 1990

[30] Foreign Application Priority Data

Mar. 16, 1990 [NL] Netherlands ................... 9000617

[51] Int. Cl.$^5$ ............................................ B01D 1/00
[52] U.S. Cl. ........................................ 159/47.3; 34/10; 34/60; 71/21; 159/DIG. 24; 203/22; 203/27; 203/DIG. 8
[58] Field of Search .............. 159/DIG. 24, 901, 47.3; 71/21; 203/2, 22, 29, 14, 27, DIG. 8; 210/770, 774; 34/10, 60

[56] References Cited

U.S. PATENT DOCUMENTS

| | | | |
|---|---|---|---|
| 31,185 | 3/1883 | Greenfield et al. | 159/17.1 |
| 3,552,358 | 1/1971 | Launder | 119/22 |
| 4,040,190 | 8/1977 | Van den Broek | 34/60 |
| 4,078,973 | 3/1978 | Choi et al. | 202/99 |
| 4,088,796 | 5/1978 | Persson | 426/807 |
| 4,147,593 | 4/1979 | Frischmuth et al. | 201/21 |
| 4,255,129 | 3/1981 | Reed et al. | 202/118 |
| 4,270,974 | 6/1981 | Greenfield et al. | 159/16 |
| 4,276,115 | 6/1981 | Greenfield et al. | 159/17.1 |
| 4,909,825 | 3/1990 | Eigner | 71/21 |

FOREIGN PATENT DOCUMENTS

| | | |
|---|---|---|
| 2940164 | 4/1980 | Fed. Rep. of Germany . |
| 3513159 | 10/1986 | Fed. Rep. of Germany . |
| 1131058 | 2/1957 | France . |
| 8001407 | 7/1980 | World Int. Prop. O. . |

Primary Examiner—Virginia Manoharan
Attorney, Agent, or Firm—Webb, Burden, Ziesenheim & Webb

[57] ABSTRACT

A method for treating manure including the drying of manure by displacing water out of the manure by a carrier liquid, extracting the carrier liquid by evaporation and purifying the carrier liquid vapor for re-use, wherein fats originally present in the manure are released as manure fat, by burning the manure fat in a controlled manner and at least partially using energy thereby released in the process.

6 Claims, No Drawings

METHOD FOR TREATING MANURE

The invention relates to a method for treating manure.

It is of importance for the cost-effectiveness of treating processes for manure to separate as many valuable products as possible out of the manure. An optimal balance has of course to be sought here between on the one hand the costs of the process and on the other hand the return on the sales of the products.

A per se known treatment process which enables the separation of useful products from the manure in economic manner is the so-called Greenfield process. This is described in the American U.S. Pat. Nos. 3,855,079, 4,270,974 and 4,608,120, among others. In this known process a carrier liquid such as a non-volatile oil is added to the manure which displaces the water out of the manure because the water evaporates through the effect of heat. The carrier liquid is then removed through evaporation and purified for re-use. The carrier liquid also serves as extraction agent for the fats originally present in the manure. These are released as manure fat during the purifying of the carrier liquid vapor.

This manure fat which is released as a product of the process in a quantity of approximately 10% of the initial amount of manure based on the dry substance content, can for instance be re-used in mixed fodder. Another possibility is the conversion of the manure fat into high-grade protein.

In the light of the above the invention has for its object to embody a method of the type specified in the preamble such that a high economic efficiency is achieved.

This object is achieved with the method according to the invention by burning the manure fat in a controlled manner and at lest partially using the energy thereby released in the manure treating process.

According to a first embodiment of the invention this can be carried out by burning the manure fat in a boiler wherein a heat transporting medium used in the process is heated. By burning the recovered manure fat roughly 50% of the thermal energy requirement for the manure treating can be covered. The saving achieved herewith is considerable.

The manure fat is preferably burned at a flame temperature of a maximum of 1100° C. It has been found that any possible problems with respect to slag deposition in the burner and boiler can hereby be avoided. It generally is desirable to take steps for cooling the flame formed during the burning.

In accordance with the specific conditions whereunder the manure treating process is carried out, the manure fat can contain quite a large quantity of solid constituents with a very small particle size. During burning these solid constitutents are released as dust ash. In order to prevent the boiler becoming rapidly dirtied by the dust ash, and therefore to avoid regular operational stoppage for cleaning of the boiler, according to the preferred embodiment of the method according to the invention the dust is removed from the flue gases directly after burning and the cleaned flue gases are carried further to the heat exchanger part of the boiler to heat the heat transporting medium.

In a very favorable further development of the invention the manure fat is burned in a diesel engine and the heat of the cooling agent and the exhaust gas of the diesel engine are used for heating a heat transporting medium that is used further in the manure treating process. The mechanical energy produced by the diesel engine during burning of the manure fat can for instance be used for driving conveyors, pumps and the like. The mechanical energy is however preferably converted into electrical energy which is at lest partially re-used for driving electro-motors active in the process. As a result of the thus realized combined heat-power production, energy cost savings that are more than four times greater an be achieved than with the burning of the manure fat in a boiler. An additional advantage of this further development of the invention is that the legal requirements imposed on exhaust gases of diesel engines with respect to the emission of harmful substances are less strict than on the discharge gases of combustion boilers. The necessary investment for cleaning the exhaust gases can therefore be lower.

The invention also relates to and provides a device for treating manure comprising means for extracting from the manure fats present therein such as manure fate, a burning device for the manure fat which comprises heat transfer means for transferring heat released during the burning to a heat transporting medium.

In a first embodiment of the device according to the invention the burning device comprises a combustion boiler having a burner wherein combustion air is supplied in stages to which manure fat can be fed and a heat exchanger through which an flow heat transporting medium. The thermal energy is used in the manure treating device for example for dehydrating the manure by evaporation.

The burner preferably comprises means for cooling the flame. These means can for instance be embodied such that steam of water is injected herewith into the flame. Another possibility is to mount the burner in a water-cooled furnace tube. The flame can then rapidly transfer heat to the relatively cool wall of the furnace tube through radiation.

The boiler is preferably embodied as a fire tube boiler. Since a relatively large quantity of ash constituents can be released during burning of manure fat, the boiler can quickly become dirtied. A fire tube boiler has in contrast to a water tube boiler the advantage that it can be cleaned quickly.

Another favorable embodiment of the combustion boiler is one wherein a heat resistently walled cyclone for separating dust is arranged between the burner and the heat exchanger. Because a considerable portion of the dust ash formed during burning of the manure fat can be separated from the hot flue gases, the heat exchanger of the boiler connected thereafter remains to a considerable extent free of dirt so that the cleaning frequency will be markedly lower.

In a further development of the device according to the invention wherein the burning device is a combustion boiler, a filtering device for the manure fat is employed which can remove very small particles from the manure fat. An ultra-centrifuge can for instance be used which can separate particles greater than 1 $\mu$m out of the manure fat. By treating the manure fat beforehand in the filtering device, a significant portion of the solid particles is removed so that no, or practically no, dust ash is formed during burning and dirtying of the boiler is thus greatly reduced.

According to a very favorable further development of the device according to the invention the burning device comprises a diesel engine of the type that is suitable for burning heavy fuel oil. The heat transfer means comprise therein cooling liquid and exhaust gas coolers. The released heat is again guided to determined points in the manure treating process by means of a heat transporting medium. In order also to avoid any possible problems with a diesel engine with regard to dirtying, the manure fat can her also be purified beforehand of solid constituents in a suitable manner, or a manure treating process can be performed such that only a small quantity of solid constituents occurs in the manure fat.

As is known, a diesel engine provides roughly a third of the energy present in the fuel as mechanical energy. According to a favorable embodiment of the device according to the invention this mechanical energy can be converted into electrical energy because an electrical generator is coupled to the diesel engine. The provided electrical energy can be used for a considerable part in the manure treating installation for driving pumps, conveyors and the like. Any surplus of electrical energy can be delivered to the consumer electricity grid, for payment of course.

Since use can be made of components known per se the above description provides a person skilled in the art sufficient information to be able to use the invention.

What is claimed is:

1. A method for treating manure consisting essentially of the steps of:
   a) drying manure by displacing water out of said manure by a carrier liquid;
   b) simultaneously extracting fat from said manure with the same carrier liquid;
   c) removing the carrier liquid through evaporation to release fats originally present in the manure as manure fat and purifying said carrier liquid for reuse;
   d) burning the manure fat obtained in step c) in a controlled manner in a burning device which comprises heat transfer means, said means transferring heat released during the burning to a heat transporting medium; and
   e) at least partially using energy transferred to the heat transporting medium in the method for treating manure.

2. Method as claimed in claim 1, wherein the manure fat is burned in a boiler wherein the heat transporting medium used in the method is heated and wherein the manure fat is burned at a flame temperature of a maximum of 1100° C.

3. Method as claimed in claim 2, wherein combustion air is supplied to the boiler in stages.

4. Method as claimed in claim 2, wherein dust is removed from flue gases directly after burning and the heat transporting medium is heated with the cleaned flue gases.

5. Method as claimed in claim 1, wherein the manure fat is burned in a diesel engine and heat of a cooling agent and exhaust gas of the diesel engine is used for heating the heat transporting medium used in the method.

6. Method as claimed in claim 5, wherein mechanical energy produced by the diesel engine is converted into electrical energy which is at least partially used for driving electromotors operative in treating manure.

* * * * *